Patented June 24, 1930

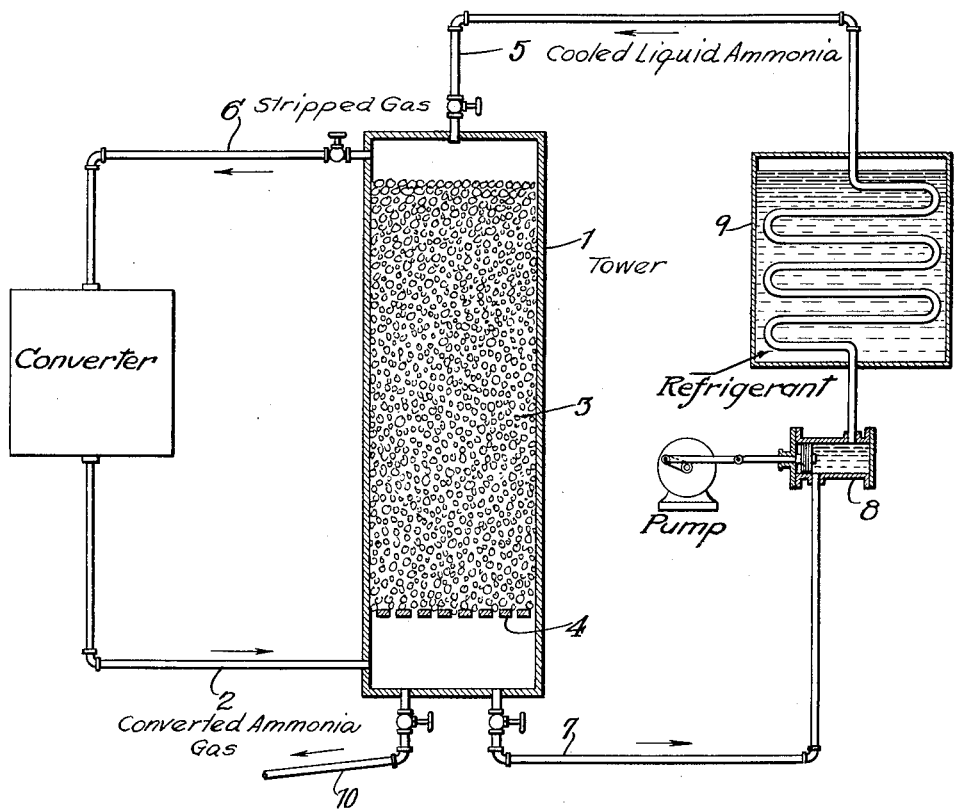

1,765,541

UNITED STATES PATENT OFFICE

RALPH S. RICHARDSON, OF TEANECK, NEW JERSEY, ASSIGNOR TO CHEMICAL ENGINEERING CORPORATION, OF NEW YORK, N. Y., A CORPORATION OF DELAWARE

SYNTHETIC PRODUCTION OF AMMONIA

Application filed February 26, 1927. Serial No. 171,144.

My invention relates particularly to improved methods for separating ammonia from the synthesized ammonia-containing gases.

In the synthesis of ammonia at high pressure, the removing of the relatively small portion of ammonia formed during passage of nitrogen-hydrogen gases over a catalyst from the uncombined nitrogen-hydrogen gases has been accomplished in several ways.

One method is to wash out the ammonia by direct contact with water or other solvents. Such method is open to objections in that the uncombined gases leave the ammonia removal apparatus saturated with the solvent. Another method is to condense the ammonia by indirect cooling with water or other refrigerant whereby the heat from the synthesized gas mixture is transferred through a metal wall.

I have discovered that the gaseous ammonia fraction may be removed efficiently from the synthesized gases by actual contact with refrigerated liquid ammonia.

According to my invention, liquid ammonia, which is the product obtained by liquefying ammonia gas, say at 0° C. and at a lower temperature than the synthesized gases which are at room temperature about 30° C., is brought into direct actual and direct heat exchange relationship with these synthesized gases, such gases travelling in counter-current to the flow of the liquefied ammonia, with the result that the liquid ammonia is warmed while the synthesized gases are cooled with a precipitation of their gaseous ammonia content. Such liquid ammonia may then be cooled back to its initial temperature either by water cooling or by expansion of the ammonia product, or by other known means, and thereafter used to effect further condensation in the continued cyclic processes of separation.

The accompanying drawings show in diagrammatic form an apparatus which is adapted for carrying out the methods of my invention.

The synthesized gases from the converter enter the tower 1 through the pipe 2. The tower 1 is filled with suitable packing 3 comprising broken pieces of glass or porcelain to present a surface-giving mass resting on the perforated grate 4. Such gases pass upwardly through the packing 3 in actual contact with a descending stream of relatively cooler liquid ammonia which enters the top of the tower 1 through the pipe 5. The gases leave the tower 1 through the pipe 6 and are returned to the converter. The liquid ammonia which drips through the packing 3 and grate 4 leaves the tower 1 by the pipe 7 connected with the pump 8 which forces this liquid ammonia through the refrigerator tank 9 and the liquid ammonia re-enters the top of the tower 1 through the pipe 5 as has been hereinbefore described. Such ammonia as has been condensed from the synthesized gases is removed from the tower 1 by the pipe 10.

I do not wish to restrict my improved methods to the particular apparatus shown and described as there are various ways of applying my invention.

For example, the refrigerator tank 9 may be placed on either side of the pump 8 in the circulating system for the liquid ammonia. Again water or brine may be used in the refrigerator tank 9, or the ammonia condensate withdrawn from the tower 1 through the pipe 10 may be expanded and used for refrigeration.

Another feature of my improved ammonia separation methods consists in withdrawing both the circulating liquid ammonia and the fresh condensate from the bottom of the tower 1 through the pipe 10 to another vessel, and then reducing the pressure to permit the ammonia to evaporate as a gas which is taken from the vessel with the result that the liquid ammonia stored in the vessel is put into circulation and is directly cooled in transit through the circulating system first described and is returned to the top of the tower 1.

I claim as my invention:—

1. In the synthetic production of ammonia, the step for separating ammonia from synthesized ammonia-containing gases which consists in passing the synthesized gases after catalysis in actual contact with, but in counter-current flow to, relatively cooler liquid ammonia in circulation.

2. In the synthetic production of ammonia, the method for separating ammonia from synthesized ammonia-containing gases which comprises distributing relatively cooler liquid ammonia over a surface-giving mass, simultaneously passing the synthesized gases after catalysis in actual contact with the liquid ammonia through the mass in counter-current to the flow of said liquid ammonia, and removing the ammonia condensate formed.

3. In the synthetic production of ammonia, the method for separating ammonia from synthesized ammonia-containing gases which comprises distributing relatively cooler liquid ammonia over a surface-giving mass, simultaneously passing the synthesized gases after catalysis through the mass in actual contact with the liquid amomnia, but in counter-current to the flow of such liquid ammonia in circulation.

4. In the synthetic production of ammonia, the steps for separating ammonia from synthesized ammonia-containing gases which comprise passing the synthesized gases after catalysis under pressure in actual contact with, but in counter-current flow to, relatively cooler liquid ammonia in circulation and then cooling such liquid ammonia to its initial temperature.

5. In the synthetic production of ammonia, the method for separating ammonia from synthesized ammonia-containing gases which comprises distributing relatively cooler liquid ammonia over a surface-giving mass, simultaneously passing the synthesized gases after catalysis in actual contact with the liquid ammonia through the mass in counter-current to the flow of said liquid ammonia, and removing the ammonia condensate formed while maintaining a continuous circulation of liquid ammonia in actual contact with the gases through the mass.

6. In the synthetic production of ammonia, the steps for separating ammonia from synthesized ammonia-containing gases which comprise passing the synthesized gases after catalysis under pressure in actual contact with, but in counter-current flow to, relatively cooler liquid ammonia in circulation and then cooling such liquid ammonia to its initial temperature while continuing its circulation in actual contact with said gases.

7. In the synthetic production of ammonia, the steps for separating ammonia from synthesized ammonia-containing gases which comprise passing the synthesized gases after catalysis under pressure in actual contact with, but in counter-current flow of, relatively cooler liquid ammonia in circulation, simultaneously removing the ammonia condensate and liquid ammonia and reducing the pressure to allow the condensate to evaporate whereby the liquid ammonia in actual contact with the gases in circulation is cooled.

RALPH S. RICHARDSON.